Figure 1:
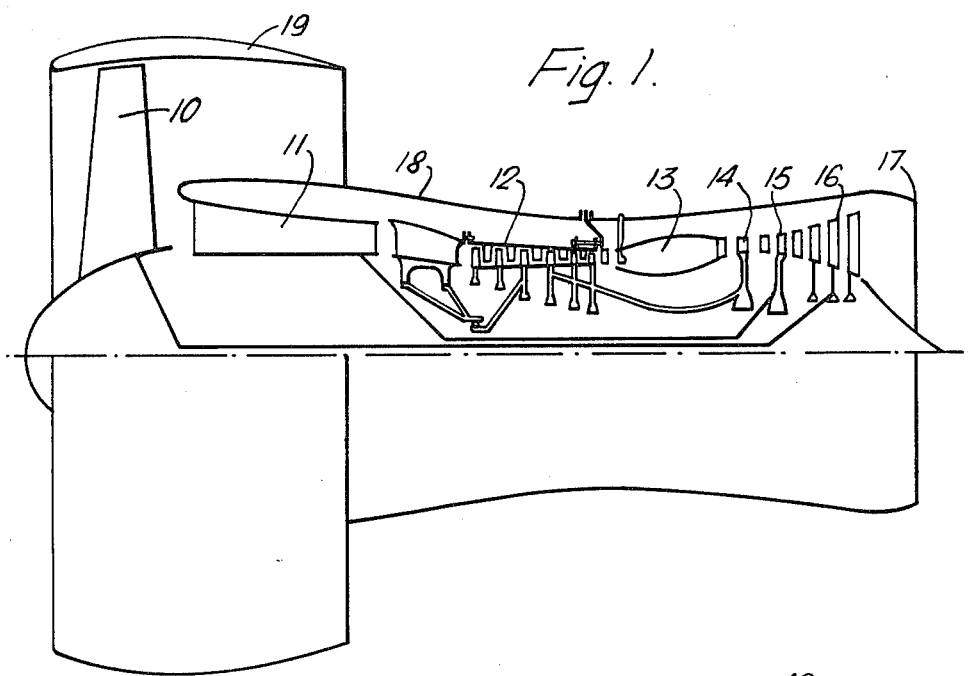

United States Patent [19]

Perry

[11] Patent Number: 4,482,293
[45] Date of Patent: Nov. 13, 1984

[54] CASING SUPPORT FOR A GAS TURBINE ENGINE

[75] Inventor: Derick A. Perry, Derby, England

[73] Assignee: Rolls-Royce Limited, London, England

[21] Appl. No.: 348,001

[22] Filed: Feb. 2, 1982

[30] Foreign Application Priority Data

Mar. 20, 1981 [GB] United Kingdom ............... 8108754

[51] Int. Cl.³ ............................................. F01D 11/00
[52] U.S. Cl. .................................. 415/219 R; 415/14; 415/113; 415/127
[58] Field of Search ................. 415/12, 14, 17, 127, 415/134, 139, 177, 178, 219 R

[56] References Cited

U.S. PATENT DOCUMENTS

| | | | |
|---|---|---|---|
| 2,684,568 | 7/1954 | Senger | 415/14 |
| 2,994,472 | 8/1961 | Botje | 415/178 |
| 3,227,418 | 1/1966 | West | 415/136 |
| 3,923,415 | 12/1975 | Benedict | 415/168 |
| 4,097,722 | 6/1978 | Soler et al. | 415/219 R |
| 4,127,357 | 11/1978 | Patterson | 415/177 |
| 4,247,247 | 1/1981 | Thebert | 415/113 |
| 4,334,822 | 6/1982 | Rossmann | 415/127 |
| 4,384,819 | 5/1983 | Baker | 415/1 |

FOREIGN PATENT DOCUMENTS

| | | | |
|---|---|---|---|
| 47701 | 1/1977 | Japan | 415/14 |
| 47909 | 9/1979 | Japan | 415/219 R |
| 318729 | 1/1972 | U.S.S.R. | 415/127 |

*Primary Examiner*—Henry C. Yuen
*Assistant Examiner*—John Kwon
*Attorney, Agent, or Firm*—Cushman, Darby & Cushman

[57] ABSTRACT

A casing support structure for a gas turbine engine is provided with means for reducing the effect of distortions such as are produced by differential heating of the structure on shut-down. To this end the casing is mounted from supporting structure by links which are arranged to be individually heated by associated heaters. The degree of heating of the links is arranged to provide differential expansion which moves the casing so as to reduce the effect of eccentricities on the clearance between the casing and its associated rotor structure.

9 Claims, 6 Drawing Figures

CASING SUPPORT FOR A GAS TURBINE ENGINE

This invention relates to a casing structure for a gas turbine engine and is particularly but not exclusively applicable to a compressor casing support structure.

In recent years it has been recognised that one important parameter which affects the efficiency of operation of a gas turbine engine comprises the tip clearance between various of the rotor blades of the engine and the associated static casing structure. There are various effects which tend to alter these clearances or to force the designer to increase them. One of the most difficult effects to compensate for comprises the phenomenon known as hogging. Hogging is caused when an engine comes to rest and the heat content within the engine is gradually dissipated. Because of convection effects the bottom part of the engine cools more quickly than does the top part and this leads to differential thermal expansion which causes the engine to bow upwardly.

There have been various attempts to solve the problems of hogging. One possible solution is to arrange that the clearances between rotors and stators are relatively large and are closed up in normal operation of the engine by directing cooling air onto the static casings. However, this method involves the use of considerable amounts of cooling air which is detrimental to the efficiency of the engine.

The present invention provides a way in which the deleterious effects of hogging may be reduced.

According to the present invention a casing support structure for a gas trubine engine comprises a casing, a plurality of links extending between the casing and support structure, and differential heating means whereby the links may be differentially heated to cause them to expand differentially and to displace the casing with respect to the support structure.

We prefer to use electrical induction heaters to heat the links.

In one embodiment the links lie parallel to the axis of the engine and the casing is located at its extremity distant from the links in a mounting which will allow it to gimbal.

There may be sensors to measure the clearance between the static and rotary structure at various circumferential positions and distribution means which cause the links to be heated in such a way as to increase at the least value of the sensed clearances.

Figure 2:
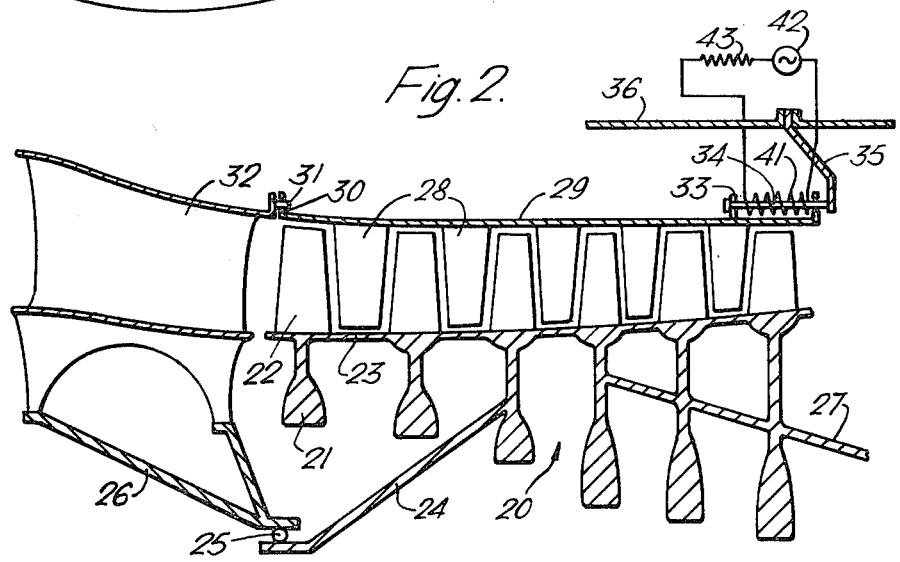
Figure 3:
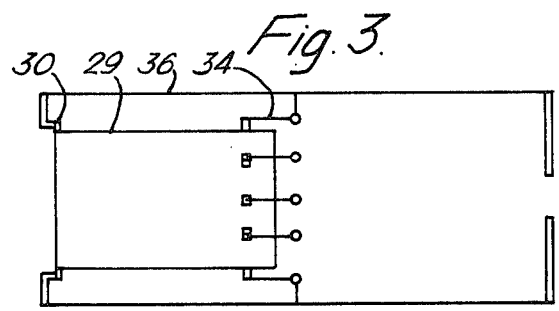
Figure 4:
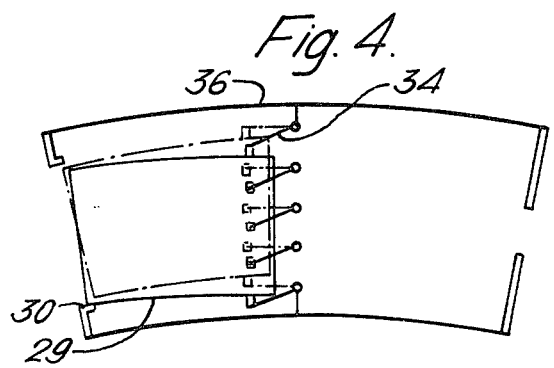
Figure 5:
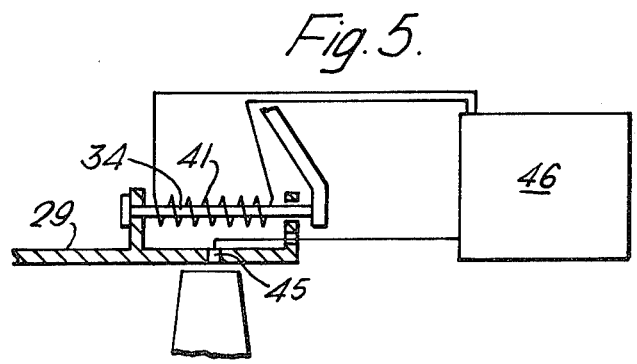
Figure 6:
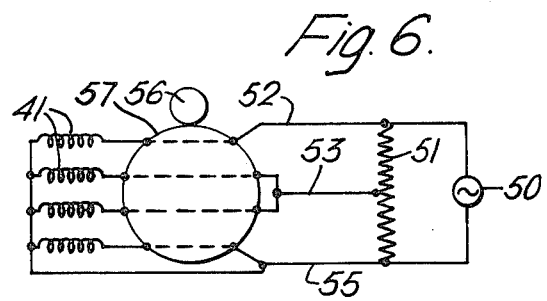

The invention will now be particularly described merely by way of example with reference to the accompanying drawings in which:

FIG. 1 is a partly broken away view of a gas turbine engine having a casing support structure in accordance with the invention, FIG. 2 is an enlarged section through a compressor of the engine of FIG. 1 illustrating the casing support structure, FIG. 3 is a highly simplified view of the casing support structure of FIG. 2, FIG. 4 is a view similar to FIG. 3 but which sheds the effect of hogging and how it is countered by the invention, FIG. 5 is a view similar to part of FIG. 2 but showing a further embodiment and FIG. 6 illustrates an electrical distribution arrangement suitable for use in conjunction with the embodiment of FIG. 5.

In FIG. 1 there is shown a typical gas turbine engine in which the present invention is applicable. It should be noted at the outset that the engine illustrated is a three shaft front fan engine. However, it would be quite possible to apply the invention to any of the conventional types of gas turbine engine.

The engine in FIG. 1 consists of a fan 10, an intermediate pressure compressor 11, a high pressure compressor 12, a combustion system 13, a high pressure turbine 14, an intermediate pressure turbine 15 and a low pressure or fan turbine 16. These units are mounted in flow series so that air is compressed by fan 10 and the compressors 11 and 12 and fuel is added to the compressed air and burnt in the combustion system 13. The resulting hot gases pass through and drive the turbines 14, 15 and 16 in sequence and exhaust through a nozzle 17 to provide propulsive thrust. The turbines are drivingly interconnected with their respective compressors so as to drive the compressors. In addition to the air from the fan which passes into the compressor 11 there is another flow of air which passes outside the compressor 11 between a casing 18 and fan casing 19 to provide additional propulsive thrust.

The high pressure compressor 12 is shown in great detail in FIG. 2. The compressor consists of a compressor rotor generally indicated at 20 which in the present instance comprises a series of rotor discs 21 each carrying from its annular periphery an annular stage of axial flow compressor blades 22. The rims of the discs 21 are extended in a substantially axial direction or are provided with spacer pieces 23 so that the complete assembly forms a compressor drum.

The compressor drum is supported on a shaft 24 from a rolling element bearing 25 carried from a bearing panel 26. At its upstream extremity the drum has a drive shaft 27 which extends rearwardly of the engine and is connected to the high pressure turbine 14. A further rolling element bearing supports the turbine 14 and provides support for the rearward extremity of the compressor drum.

Co-operating with the axial flow compressor blades 22 are a plurality of axial flow stator stages each stator stage being interposed between two stages of rotors 22. The stators 28 are carried from a substantially cylindrical 29. In between the stator stages 28 the casing 29 has a substantially cylindrical inner surface which is closely approached by the tips of the blades of the relevant rotor stage 22. It has been found that the clearance which is necessary between these rotor blade tips and the inside of the rotor facing has a considerable effect on the efficiency of the engine. This is particularly true of the downstream stages of the compressor (to the right of the drawing) where the radial depth of the blades is in any case relatively small. In order to ensure that these clearances are maintained as low as possible the casing 29 is supported at its upstream extremity through a flange 30 having apertures therein through which the pass co-operating spigots 31. The spigots 31 are carried from a vane structure 32 which forms part of the supporting structure for the bearing panel 26. The flange 30 is arranged to lie in substantially the same plane as the bearing 25 and the effect of this spigot and hole mounting is to allow the casing 29 to gimbal to a small degree about the centre of the bearing 25.

Towards its outer extremity the casing 29 is provided with a plurality of flanges each of which is connected by an axially extending link 34 to a diaphragm structure 35 which is bolted to the main supporting casing 36 of the engine. The circumferentially spaced apart plurality of links 34 form a three dimensional parallelogram linkage which ensures that the casing 29 is maintained parallel with that part of the casing 36 to which the flange structure 35 is bolted. By careful choice of the position of this bolted support it is possible to arranged that the casing is kept parallel with the axis of the rotor under normal operating conditions. This supporting structure forms the subject matter of British patent application No. 8033849, which corresponds to U.S. patent application Ser. No. 308,193 filed Sept. 18, 1981 by Pask and having the same assignee, Rolls-Royce Limited, as this application.

FIG. 3 shows in a highly simplified manner a casing 29 and its support at 30 and 34 from the load bearing casing 36. For normal operating this type of support is quite sufficient but when the engine is shut down, hogging caused by differential cooling as referred to above will distort not only the casing 36 but also the casing 29. Under these circumstances all the casing and rotor assemblies of the engine will be bowed to substantially the same degree.

FIG. 4 illustrates the effect of this hogging on the simplified version of the assembly shown in FIG. 3. It will be seen that the casing 36 is now bowed (the extent of this bowing is exaggerated for clarity) and in the broken line version the casing 29 is seen to be similarly bowed. It is clear that this bowing has caused the right hand extremity of the casing 29 to be displaced from the normal axis 40 of the engine. In a similar fashion the rotor will also bow and if the engine starts to operate in this condition the rotor will at least initially act like a skipping rope. The central part of the rotor which is close to the downstream extremity of the casing 29 will effectively have a larger tip radius, while because of the distortion of the casing 29 the minimum dimension between the inside of the casing and the normal axis of the rotor will be reduced. Although the FIG. 4 view is considerably exaggerated it is still true that this combination of a bowed rotor and distorted casing 29 will reduce the clearances considerably and present the designer with a need either to open up the clearances to cater for this case or to provide some way in which the distortion of the casing or the bowing of the rotor or both may be reduced.

In the present invention therefore as can best be seen in FIG. 2 the support system is modified in that induction heating coils 41 are provided which surround each of the links 34. These induction heating coils are provided with electricity supply means shown diagrammatically as an alternator 42 and resistor 43. Ir the intention is simply to reduce the effect of casing distortion due to hogging the resistors 43 will be of fixed values or will comprise fixed tappings from an potentiometer. It is possible to provide a variable arrangement which is described below in relation to FIGS. 5 and 6.

The resistors 43 are arranged so that the links 34 at the bottom of the engine are caused to expand to a greater degree than those at the top of the engine. In fact those links at the very top of the engine may not need to be heated at all. Consequently thermal expansion of the links will take place and this will be greatest for the links at the bottom of the engine and will reduce in the links closer to the top of the engine.

FIG. 4 illustrates the effect of this. The solid line depiction of the casing 29 shows how the differential expansion of the links has caused the casing to rotate in its gimbals arrangement at 30 about the centre of the bearing 25, in such a way as to cause the downstream extremity of the casing 29 to become substantially concentric with the axis 40. The effect of the bowed shaft acting like a skipping rope will still require a slightly greater clearance to be left than would be necessary without this bowing but the degree of clearance overall may then be reduced.

When this system is used to counteract the effects of hogging it is expected that the induction heaters 41 will be switched on once the engine has stopped and a time switch will cause the current to continue to flow until the hogging has ceased. This may involve some 30 minutes useage. Because the links are relatively small in mass they will be heated rapidly and easily by the induction heaters and the expenditure of energy will be quite small.

As described above the principle of heating and expanding the links has been used to counteract the problem of hogging. It is clearly possible to use the same principle to counteract the effect of other distortions which could result in an unequal value of clearance between rotating and static components or eccentricity between these components.

FIGS. 5 and 6 illustrate how this could be carried out in principle. FIG. 5 shows the rear end of a compressor similar to that of FIG. 2. However, in this case a sensor 45 is provided to measure the clearance between the tips of the highest pressure stage of rotor blades 22 and the associated part of the casing 29. A plurality of these sensors 45 are spaced about the circumference of the casing and it would in general be arranged that each sensor was aligned with one of the links 34. In FIG. 5 the output from the sensor 45 is shown as feeding into the control box 46 which provides heating current to the induction coils 41.

Operation of this system would be that the outputs from the annular array of sensors 45 would be compared in the control unit 46 to determine the closest value of clearance. The control unit would then arrange that the links 34 closest to this minimum clearance would receive the greatest heating, the degree of heating then tapering off away from this link. In this way the casing 29 would be tilted so as to enlarge the smallest clearance at the expense of a reduction in the diametrically opposed clearance; this would normally suffice to improve concentricity.

It is clearly possible to devise various alternatives for the control unit 46 but in FIG. 6 is illustrated one possible way of directing the necessary different heating currents to the various induction heating coils. Here a single alternator 50 feeds a potentiometer 51 which has three tappings from it 52, 53, and 54. A stepper motor 56 operates a rotary switch 57 whose inputs are from the tappings 52 to 54 and whose outputs are to the coils 41. Here four coils are shown to correspond to the tappings from the potentiometer; in practice there would of course be more links and coils and a correspondingly larger number of tappings. Clearing the currents from the four tappings will vary from a higher value to a lower value and depending upon the position of the rotary switch 57 on coil 41 will receive a high current its diametrically opposed coil will receive a low current and the intermediate two will receive an equal intermediate value of current. By driving the stepper motor 56 in accordance with the outputs from the sensors 45 at the necessary clearance control will be achieved.

Although it seems likely that the electrical induction heating described above will give good results from a relatively small energy input which can be provided by batteries or small generators it should be noted that it would be possible to provide alternative heating means for the links 34. Thus for instance it would be possible to use hot air derived if necessary from the engine itself to provide the necessary heating.

I claim:

1. A casing support structure for a gas turbine engine comprising:
    a load bearing outer casing;
    an inner casing mounted within said outer casing;
    a forward rotor bearing;
    forward support means for maintaining a forward portion of said inner casing substantially concentric with said forward rotor bearing;
    rearward support means supporting a rearward portion of said inner casing from said outer casing;
    said rearward support means comprising a parallel motion linkage interconnecting said rearward portion of said inner casing and a section of said outer casing whose axis remains parallel to the axis of said forward rotor bearing when said outer casing is otherwise distorted in bending due to applied loads, said parallel motion linkage including a plurality of parallel, circumferentially spaced and axially entending links moveable parallel to each other to allow a degree of radial displacement between said inner casing and said section of said outer casing to maintain an axis of said inner casing parallel to the axis of said section of said outer casing in normal operating conditions;
    and differential heating means for differentially heating said plurality of parallel links to cause said links to expand differentially and to displace said inner casing with respect to said outer casing to counteract the effect of distortions which produce an unequal clearance between said inner casing and a rotatable component just after shut down of the gas turbine engine.

2. A casing support structure as claimed in claim 1 and in which said forward support means comprises a stationary vane structure carrying said forward rotor bearing, means supporting said inner casing from said stationary vane structure to allow said inner caisng to perform a limited gimbal movement.

3. A casing support structure as claimed in claim 1 and in which the differential heating means comprises electrical heaters for the links.

4. A casing support structure as claimed in claim 3 and in which said heating means comprises electrical induction heating coils.

5. A casing support structure as claimed in claim 1 and in which said inner casing comprises a compressor casing.

6. A casing support structure as claimed in claim 5 and in which said inner casing is a high pressure compressor casing.

7. A casing support structure as claimed in claim 1 and comprising sensor means for measuring the clearance between said inner casing and an associated rotor.

8. A casing support structure as claimed in claim 7 and comprising an annular array of said sensor means and control means adapted to heat said links in such a way as to reduce the difference between the clearances as measured by said annular array.

9. A casing support structure as claimed in claim 1 and comprising a stepper motor which operates a rotary switch so as to provide electricity to heat desired ones of said links.

* * * * *